(12) United States Patent
Fujinaka et al.

(10) Patent No.: US 6,517,326 B2
(45) Date of Patent: Feb. 11, 2003

(54) BLOWING APPARATUS

(75) Inventors: Hiroyasu Fujinaka, Moriguchi (JP); Shizuka Yokote, Moriguchi (JP); Yukihiro Okada, Osaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/833,584

(22) Filed: Apr. 13, 2001

(65) Prior Publication Data

US 2001/0031209 A1 Oct. 18, 2001

(30) Foreign Application Priority Data

Apr. 14, 2000 (JP) ........................................ 2000-113751

(51) Int. Cl.[7] .......................... F04B 17/03; F04B 35/04
(52) U.S. Cl. ............... 417/354; 417/423.14; 417/423.7; 415/119
(58) Field of Search ........................... 417/423.1, 423.7, 417/423.14, 423.15, 354, 423.12, 365; 415/119; 416/500

(56) References Cited

U.S. PATENT DOCUMENTS

| 3,700,358 | A | * | 10/1972 | Papst et al. ................. 417/354 |
| 4,171,937 | A | * | 10/1979 | Greenfield .................. 417/424 |
| 4,554,491 | A | * | 11/1985 | Plunkett ..................... 318/254 |
| 5,026,251 | A | * | 6/1991 | Kinoshita et al. ........... 415/119 |
| 5,267,842 | A | * | 12/1993 | Harmsen et al. ............ 417/354 |
| 5,588,814 | A | * | 12/1996 | De Fillipis et al. ....... 417/423.7 |
| 6,027,307 | A | * | 2/2000 | Cho et al. ................. 415/173.5 |
| 6,074,182 | A | * | 6/2000 | Matson ................... 417/423.15 |
| 6,172,442 | B1 | * | 1/2001 | Jun ............................ 310/268 |
| 6,332,758 | B1 | * | 12/2001 | Tang et al. ................. 417/354 |

FOREIGN PATENT DOCUMENTS

| JP | 05111221 A | | 4/1993 |
| JP | 06280799 A | | 10/1994 |
| JP | 6-280799 | * | 10/1994 |
| JP | 09322505 A | | 12/1997 |

* cited by examiner

Primary Examiner—Charles G. Freay
Assistant Examiner—Han L. Lin
(74) Attorney, Agent, or Firm—Parkhurst & Wendel, L.L.P.

(57) ABSTRACT

In a conventional blowing apparatus, vibration is increased depending upon a combination of rotor magnetic poles, the number of stator salient poles and blades of a fan. In a blowing apparatus comprising a stator having a core including a M-number of salient poles, and a rotor having permanent magnets having a P-number of magnetic poles rotatably disposed such as to be opposed to magnetic pole surfaces of the stator, the stator and the rotor, in combination, forming a motor for rotating a fan having a N-number of blades, $mN \neq nM$ or $mN \neq nP$ is satisfied. With this feature, a synergism between vibration generated by cogging torque of the motor and vibration generated by rotation of the fan is moderated, and vibration and noise are reduced.

6 Claims, 3 Drawing Sheets

BLOWING APPARATUS

FIELD OF THE INVENTION

The present invention relates to a blowing apparatus.

BACKGROUND OF THE INVENTION

In recent years, with downsizing and electronizing tendencies of equipment, electrical circuits are frequently equipped at high densities. With such tendencies, since exothermic densities of electronic equipment are also increased, a blowing apparatus for cooling the equipment is used.

As shown in FIG. 3, a conventional blowing apparatus comprises a permanent magnet motor 3. The motor 3 includes a stator 1 having salient poles 1a including armature windings and a rotor 2 having permanent magnets 2a magnetized to a plurality of poles. The motor 3 drives a fan 4 having a plurality of blades 4a. A housing 5 is disposed around an outer periphery of the fan 4. The motor and the housing are fixed by means of a plurality of spokes 6.

However, when the stator core is worked, magnetic characteristics of the silent poles of the stator core differ due to deviation of working distortion or composition of the magnetic materials, and due to this distortion, even if the position of the silent poles of the stator and the magnetic poles of the rotor, and the conductive state are stable, a difference in generated torque is generated depending upon the silent poles. Such variation in torque generated by the distortion of the stator is caused the same times as the number of rotor poles with respect to the rotation of the rotor. This variation in torque acts as a vibration source and generates vibration and noise. Further, when the fan is rotated, vibrations are generated the same times as the number of fan blades per one rotation. Here, if the rotation frequency is defined as 1-degree, and the number of vibration of the variation per one rotation of the rotor is defined as order, if the same number of blades as the order or a submultiple of vibration generated due to the stator distortion or twice the number of blades are mounted, vibration generated by stator distortion and vibration generated by the rotation of blades coincide with each other, and there is a problem that the vibration is increased. Thereupon, in the conventional technique, the number of rotor poles is 4 and the number of fan blades is 6 and thus, the basic order of vibration is 12th-degree which is a minimum common multiple of 4 and 6.

Further, in the rotor portion, depending upon mechanical distortion of a rotor frame and permanent magnet, polarization distortion of the permanent magnet, deviation caused by assembling distortion of a shaft and a bearing, effective magnetic flux amount crossing the stator winding from the rotor permanent magnet differs. That is, since the generated torque is different depending upon magnetic poles, this is a cause of vibration which generates distortion of rotation. The vibration caused by the rotor distortion is generated the same times as the number of stator silent poles with respect to the rotor rotation. If the same number of blades as the order or a submultiple of vibration generated due to the rotor distortion or twice the number of blades are mounted, vibration generated by stator distortion and vibration generated by the rotation of blades coincide with each other, and there is a problem that the vibration is increased. Thereupon, in the conventional technique, the number of rotor poles is 4 and the number of fan blades is 6 and thus, the basic order of vibration is 12th-degree which is a minimum common multiple of 4 and 6.

Further, in the permanent magnet motor, magnetic flux generated from the permanent magnet crosses the stator core. Since the stator core has a shape of the silent pole, the magnetic resistance is varied by the rotational position of the rotor and thus, torque called cogging torque which is proportional to variation ratio of the magnetic resistance is generated in the rotor. The cogging torque is varied depending upon the positional relation between the silent pole of the stator core and the rotor magnetic pole, and variation is generated in the minimum common multiple of the number of stator silent poles and the number of rotor magnetic poles with respect to the rotor rotation, and this causes vibration of the motor. If the same number of blades as the order or a submultiple of vibration generated due to the rotor distortion or twice the number of blades are mounted, vibration generated by stator distortion and vibration generated by the rotation of blades coincide with each other, and there is a problem that the vibration is increased. Thereupon, in the conventional technique, the number of stator silent poles is 4, the number of rotor magnetic poles is 4 and the number of fan blades is 6, the basic order of the cogging torque is 4 th-degree which is a minimum common multiple of the number of stator silent poles and the number of rotor magnetic poles, and the basic order of vibration is 12th-degree which is a minimum common multiple of 4 and 6.

In the blowing apparatus, the motor to which the fan is mounted is fixed to the housing through the spokes. Vibration generated by the motor and the fan is transmitted to the spokes and the housing. Therefore, shapes of the spokes and housing largely effect the vibration of the blowing apparatus.

As a method for reducing the vibration of the blowing apparatus, there is a method to reduce the cogging torque which is a source of vibration, and to optimize the shapes of various members, but even if the vibration source of the motor and the fan is reduced, vibration of the entire blowing apparatus is not reduced depending upon the combination in some cases.

The present invention is for solving the conventional problem, and it is an object of the invention to provide a blowing apparatus having low noise and vibration.

SUMMARY OF THE INVENTION

To solve the above problem, the present invention proposes a blowing apparatus comprising a stator having a core including a M-number of salient poles, a rotor having permanent magnets having a P-number of magnetic poles rotatably disposed such as to be opposed to magnetic pole surfaces of the stator, a motor for rotating a fan having a N-number of blades, a polygonal housing having a Q-number of sides disposed around an outer periphery of the fan, and a R-number of spokes for fixing the housing and the motor. The minimum common multiple is increased by various combinations of the numbers.

With the above means, it is possible to increase the order of vibration, i.e., it is possible to reduce the energy of vibration and to suppress the vibration and noise of the blowing apparatus. When the above blowing apparatus is mounted in a apparatus. When the above blowing apparatus is mounted in a personal computer as electronic equipment for example, it is possible to reduce the noise of the electronic equipment.

To solve the above problem, the present invention provides a blowing apparatus comprising a stator having a core including a M-number of salient poles, a rotor having permanent magnets having a P-number of magnetic poles rotatably disposed such as to be opposed to magnetic pole surfaces of the stator, the stator and the rotor, in combination, forming a motor for rotating a fan having a N-number of blades, a polygonal housing having a Q-number of sides disposed around an outer periphery of the fan, and a R-number of spokes for fixing the housing and the motor, wherein mN≠nM is satisfied.

The present invention satisfies mN≠nP.

If a minimum common multiple of the number M of the stator salient poles and the number P of rotor magnetic poles is defined as A, the invention satisfies mN≠nA.

Further, the invention satisfies mQ≠nM.

Further, the invention satisfies mQ≠nP.

Further, the invention satisfies mQ≠nA.

Further, the invention satisfies mQ≠nN.

Further, the invention satisfies mR≠nM.

Further, the invention satisfies mR≠nP.

Further, the invention satisfies mR≠nA.

Further, the invention satisfies mR≠nN.

Further, the invention satisfies mR≠nQ.

The present invention provides electronic equipment incorporating the above blowing apparatus.

Here, one of m and n is a natural number which is a factor with respect to the other.

According to the blowing apparatus having the above structure, it is possible to suppress the noise and vibration. More specifically, the invention has the following effect.

According to a first aspect of the invention, by selecting the number M of the stator salient poles and the number N of the fan blades such that the number M of the stator salient poles does not become a multiple of the number N of the fan blades and the number N of the fan blades does not become a multiple of the number M of the stator salient poles, it is possible to prevent an order vibration due to distortion or eccentricity of the rotor and an order of vibration due to the fan blades from coinciding with reach other, thereby increasing the order of the vibration of the fan. With the above arrangement, it is possible to suppress both the vibration generated by the distortion or eccentricity of the rotor and the vibration generated by the fan blades.

According to a second aspect of the invention, by selecting the number P of rotor magnetic poles and the number N of the fan blades such that the number P of rotor magnetic poles does not become a multiple of the number N of the fan blades and the number N of the fan blades does not become a multiple of the number P of rotor magnetic poles, it is possible to prevent an order vibration due to distortion of the stator and an order of vibration due to the fan blades from coinciding with reach other, thereby increasing the order of the vibration of the fan. With the above arrangement, it is possible to suppress both the vibration generated by the distortion of the stator and the vibration generated by the fan blades.

According to a third aspect of the invention, by selecting the number M of the stator salient poles, the number P of rotor magnetic poles and the number N of the fan blades such that the order A of the cogging torque does not become a multiple of the number N of the fan blades and the number N of the fan blades does not become a multiple of the order A of the cogging torque, it is possible to prevent a vibration due to the cogging torque and an order of vibration due to the fan blades from coinciding with reach other, thereby increasing the order of the vibration of the fan. With the above arrangement, it is possible to suppress both the vibration generated by the cogging torque which is peculiar to a permanent magnet motor and the vibration generated by the fan blades.

According to a fourth aspect of the invention, by selecting the number M of the stator salient poles and the number Q of sides of the housing such that the number M of the stator salient poles does not become the number Q of sides of the housing and such the number Q of sides of the housing does not become the number M of the stator salient poles, it is possible to prevent a vibration due to the distortion and eccentricity of the rotor and the vibration due to the housing from coinciding with reach other, thereby increasing the order of the vibration of the blowing apparatus. With the above arrangement, it is possible to suppress both the vibration generated by the distortion and eccentricity of the rotor and the vibration generated by the housing.

According to a fifth aspect of the invention, by selecting the number P of rotor magnetic poles and the number Q of side of the housing such that the number P of rotor magnetic poles does not become a multiple of the number Q of side of the housing and the number Q of side of the housing does not become a multiple of the number P of rotor magnetic poles, it is possible to prevent an order vibration due to distortion of the stator and an order of vibration due to the housing from coinciding with reach other, thereby increasing the order of the vibration of the blowing apparatus. With the above arrangement, it is possible to suppress both the vibration generated by the distortion of the stator and the vibration generated by the housing.

According to a sixth aspect of the invention, by selecting the number M of the stator salient poles, the number P of rotor magnetic poles and the number Q of side of the housing such that the order A of the cogging torque does not become a multiple of the number Q of side of the housing and the number Q of side of the housing does not become a multiple of the order A of the cogging torque, it is possible to prevent a vibration due to the cogging torque and an order of vibration due to the housing from coinciding with reach other, thereby increasing the order of the vibration of the blowing apparatus. With the above arrangement, it is possible to suppress both the vibration generated by the cogging torque which is peculiar to a permanent magnet motor and the vibration generated by the housing.

According to a seventh aspect of the invention, by selecting the number N of the fan blades and the number Q of sides of the housing such that the number N of fan blades does not become a multiple of the number Q of side of the housing and the number Q of side of the housing does not become a multiple of the number N of fan blades, it is possible to prevent an order vibration due to distortion of the fan and an order of vibration due to the housing from coinciding with reach other, thereby increasing the order of the vibration of the blowing apparatus. With the above arrangement, it is possible to suppress both the vibration generated by the fan blades and the vibration generated by the housing.

According to an eighth aspect of the invention, by selecting the number M of the stator salient poles and the number R of spokes such that the number M of the stator salient poles does not become a multiple of the number R of spokes and the number R of spokes does not become a multiple of the number M of the stator salient poles, it is possible to prevent an order vibration due to distortion or eccentricity of the rotor and an order of vibration due to the spokes from coinciding with reach other, thereby increasing the order of the vibration of the blowing apparatus. With the above arrangement, it is possible to suppress both the vibration generated by the distortion or eccentricity of the rotor and the vibration generated by the spokes.

According to a ninth aspect of the invention, by selecting the number P of rotor magnetic poles and the number R of spokes such that the number P of rotor magnetic poles does not become a multiple of the number R of spokes and the number R of spokes does not become a multiple of the number P of rotor magnetic poles, it is possible to prevent an order vibration due to distortion or eccentricity of the rotor and an order of vibration due to the spokes from coinciding with reach other, thereby increasing the order of the vibration of the blowing apparatus. With the above arrangement, it is possible to suppress both the vibration generated by the distortion or eccentricity of the rotor and the vibration generated by the spokes.

According to a tenth aspect of the invention, by selecting the number M of the stator salient poles, the number P of rotor magnetic poles and the number R of spokes such that the order A of the cogging torque does not become a multiple of the number R of spokes and the number R of spokes does not become a multiple of the order A of the cogging torque, it is possible to prevent a vibration due to the cogging torque and an order of vibration due to the spokes from coinciding with reach other, thereby increasing the order of the vibration of the blowing apparatus. With the above arrangement, it is possible to suppress both the vibration generated by the cogging torque which is peculiar to a permanent magnet motor and the vibration generated by the spokes.

According to an eleventh aspect of the invention, by selecting the number N of the fan blades and the number R of sides of the spokes such that the number N of fan blades does not become a multiple of the number R of spokes and the number R of spokes does not become a multiple of the number N of fan blades, it is possible to prevent an order vibration due to distortion of the fan and an order of vibration due to the spokes from coinciding with reach other, thereby increasing the order of the vibration of the blowing apparatus. With the above arrangement, it is possible to suppress both the vibration generated by the fan blades and the vibration generated by the spokes.

According to a twelfth aspect of the invention, by selecting the number R of spokes and the number Q of side of the housing such that the number R of spokes does not become a multiple of the number Q of side of the housing and the number Q of side of the housing does not become a multiple of the number R of spokes, it is possible to prevent an order vibration due to distortion of the stator and an order of vibration due to the housing from coinciding with reach other, thereby increasing the order of the vibration of the blowing apparatus. With the above arrangement, it is possible to suppress both the vibration generated by the distortion of the stator and the vibration generated by the housing.

According to a thirteenth aspect of the invention, vibration and noise of the electronic equipment are reduced.

BRIEF DESCRIPTION OF THE DRAWINGS

FIG. 3A is a sectional view of the conventional fan motor; and

MODE FOR CARRYING OUT THE INVENTION

Embodiments of the present invention will be explained with reference to the drawings below.

First Embodiment

Figure 1A:
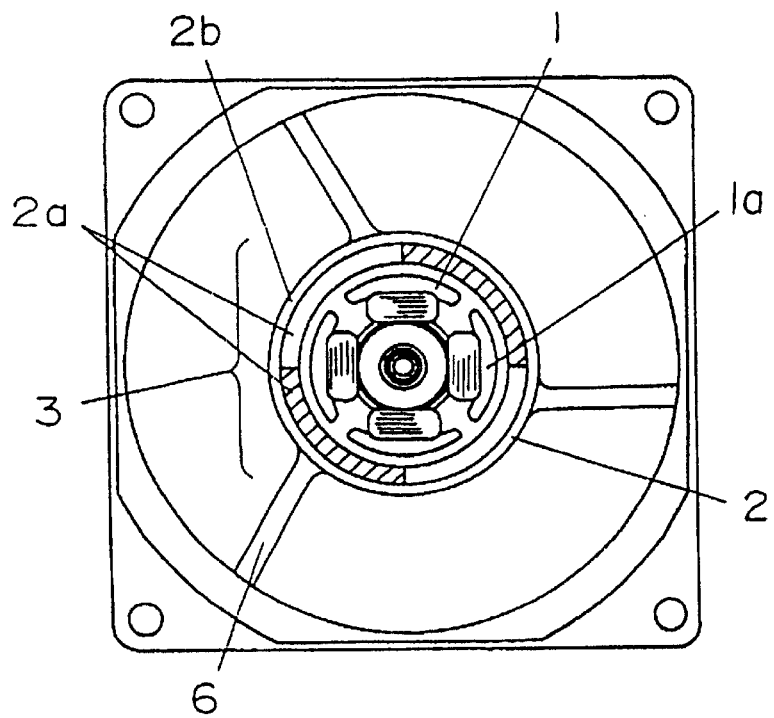
FIG. 1A is a sectional view of a fan motor according to a first embodiment of the present invention.
Figure 1B:
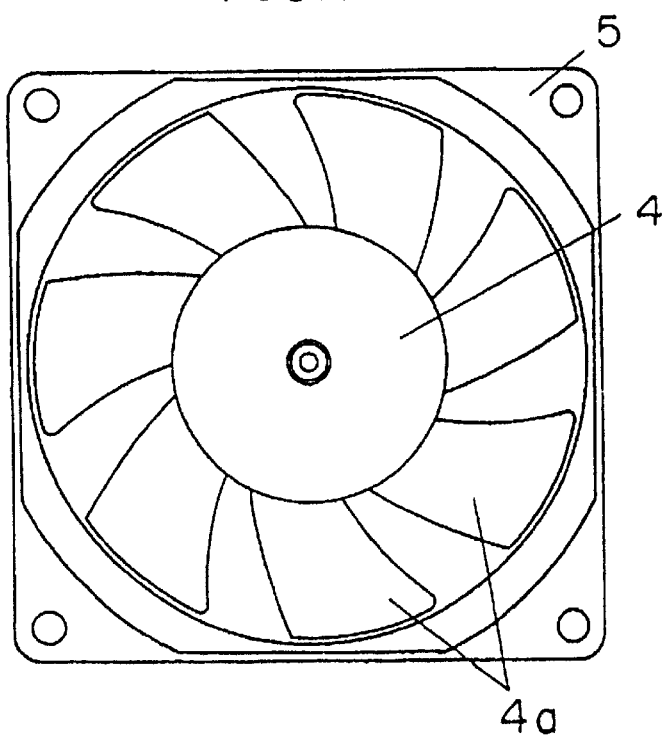
FIG. 1B is a diagram showing an outer appearance of the fan motor of the first embodiment of the invention.

As shown in FIGS. 1A and 1B, in a blowing apparatus of this embodiment, a motor 3 comprises a stator 1 having a plurality of salient poles 1a and permanent magnets 2a disposed such as to oppose magnetic pole surfaces of the salient poles 1a with gaps interposed therebetween. The motor 3 is used as a driving source to rotate a fan 4 having a plurality of blades 4a mounted to a rotor frame 2b. A polygonal housing 5 having Q-number of sides around an outer periphery of the fan 4 is disposed. The housing 5 and the motor 3 are fixed to each other through R-number of spokes 6. In this embodiment, the number M of the stator salient poles and the number N of the fan blades satisfies a relation mN≠nM (one of m and n is a natural number which is a factor with respect to the other). Here, in the conventional example, the number M of the stator salient poles is 4 and the number N of the fan blades is 6 and thus, a basic order of vibration caused by distortion of the rotor and vibration of the fan blades is 12 which is minimum common multiple of 4 and 6. As one example which satisfies the mN≠nM of this embodiment, if the number M of the stator salient poles is set to 4 and the number N of the fan blades is set to 7 as shown in FIG. 1, the vibration order is 28th-degree, the order of vibration frequency is largely increased, and the vibration can be suppressed.

Figure 2A:
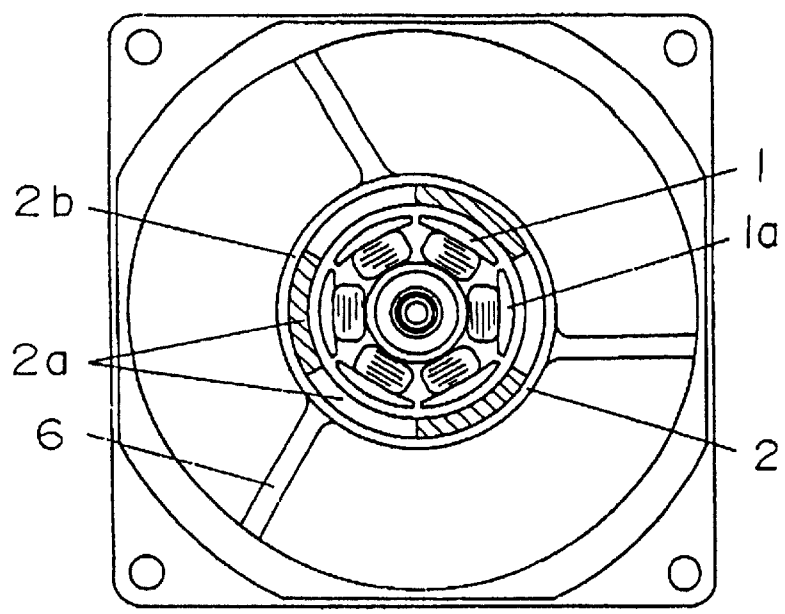
FIG. 2A is a sectional view of a fan motor according to a second embodiment of the present invention.
Figure 2B:
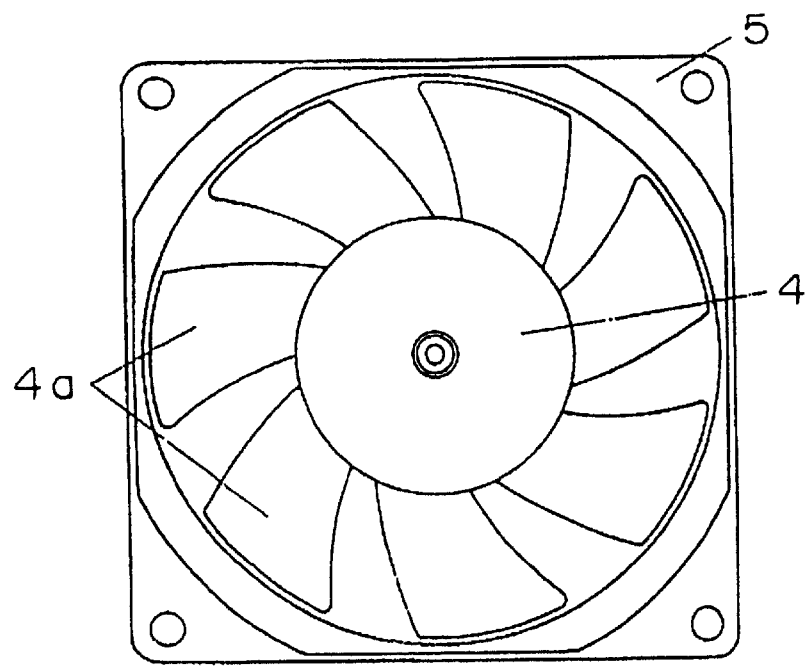
FIG. 2B is a diagram showing an outer appearance of the fan motor of the second embodiment of the invention.
Figure 3A:
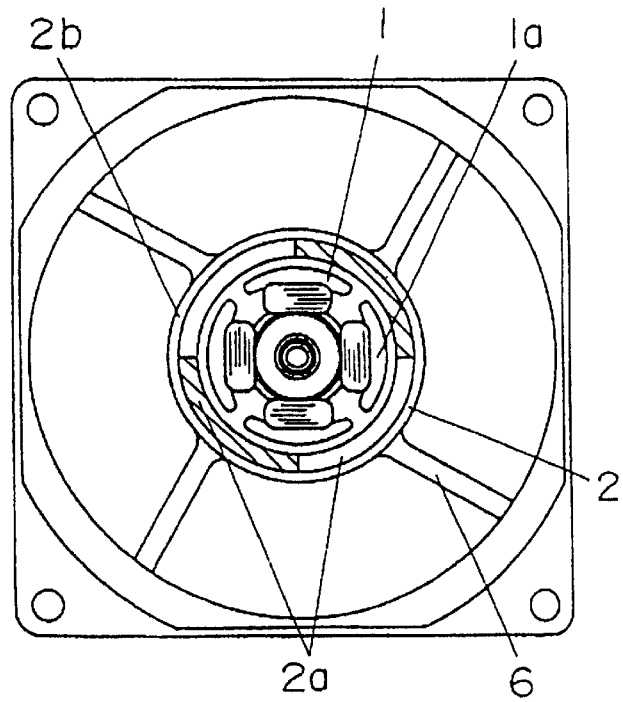
FIG. 3A is an exploded explanatory view of a conventional fan motor.
Figure 3B:
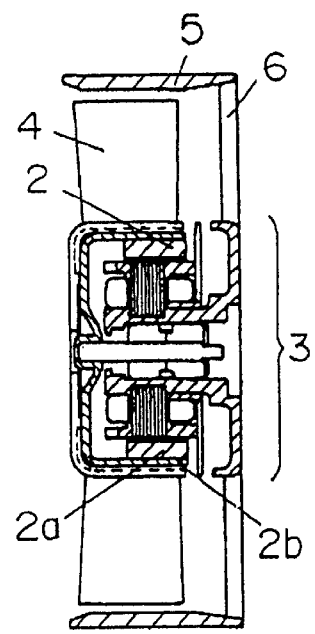
FIG. 3B is a diagram showing an outer appearance of the conventional fan motor.
Figure 3C:
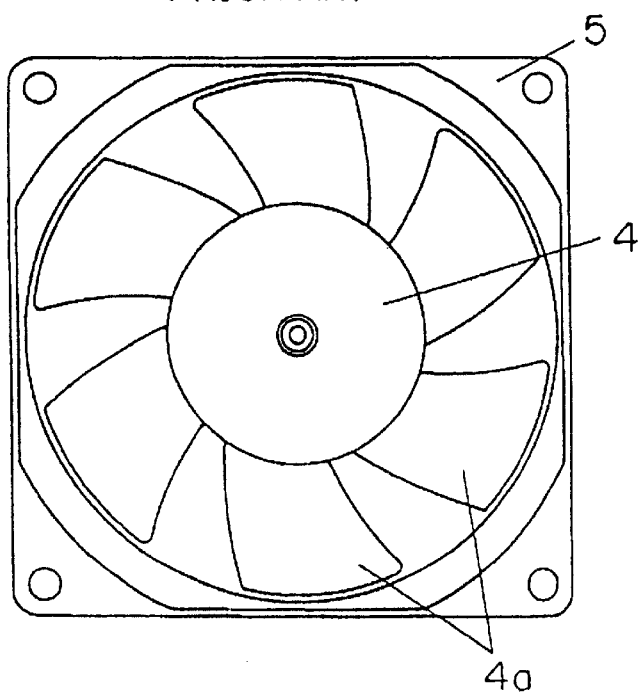

In this manner, by selecting the number M of the stator salient poles and the number N of the fan blades such that the number M of the stator salient poles does not become a multiple of the number N of the fan blades and the number N of the fan blades does not become a multiple of the number M of the stator salient poles, it is possible to prevent an order vibration due to distortion or eccentricity of the rotor and an order of vibration due to the fan blades from coinciding with reach other, thereby increasing the order of the vibration of the fan. Since the order of vibration of the fan in this case is higher than that of the vibration due to the rotor distortion and fan blades, the vibration energy becomes smaller. Therefore, with the above structure, it is possible to suppress both the vibration generated by the distortion or eccentricity of the rotor and the vibration generated by the fan blades. Further, if the number M of the stator salient poles and the number N of the fan blades are selected such as to satisfy mN=nM±1, it is possible to further increase the minimum common multiple of the number M of the stator salient poles and the number N of the fan blades. For example, as shown in FIGS. 2A and 2B, if the number of stator salient poles is set to 6 and the number of fan blades is set to 7, the vibration frequency is increased up to 42nd-degree, and it is possible to further suppress the vibration.

Second Embodiment

In this embodiment, the number P of rotor magnetic poles and the number N of the fan blades are set such as to satisfy mN≠nP (one of m and n is a natural number which is a factor with respect to the other). Here, in the conventional example, the number M of the stator salient poles is 4 and the number N of the fan blades is 6 and thus, a basic order of vibration caused by distortion of the rotor and vibration of the fan blades is 12 which is minimum common multiple of 4 and 6. As one example which satisfies the mN≠nP of this embodiment, if the number P of rotor magnetic poles is set to 4 and the number N of the fan blades is set to 7 as shown in FIGS. 1A and 1B, the vibration order is 28th-degree, the order of vibration frequency is largely increased, and the vibration can be suppressed.

In this manner, by selecting the number P of rotor magnetic poles and the number N of the fan blades such that the number P of rotor magnetic poles does not become a multiple of the number N of the fan blades and the number N of the fan blades does not become a multiple of the number P of rotor magnetic poles, it is possible to prevent an order vibration due to distortion of the stator and an order of vibration due to the fan blades from coinciding with reach other, thereby increasing the order of the vibration of the fan. Since the order of vibration of the fan in this case is higher than that of the vibration due to the rotor distortion and fan blades, the vibration energy becomes smaller. Therefore, with the above structure, it is possible to suppress both the vibration generated by the distortion of the stator and the vibration generated by the fan blades. Further, if the number P of rotor magnetic poles and the number N of the fan blades are selected such as to satisfy $mN=nM\pm1$, it is possible to further increase the minimum common multiple of the number P of rotor magnetic poles and the number N of the fan blades. For example, as shown in FIGS. 2A and 2B, if the number of stator salient poles is set to 6, and the number of fan blades is set to 7, the vibration frequency is increased up to 42nd-degree, and it is possible to further suppress the vibration.

Third Embodiment

In this embodiment, the minimum common multiple A of the number M of the stator salient poles and the number P of rotor magnetic poles and the number N of the fan blades are set such as to satisfy $mN \neq nA$ (one of m and n is a natural number which is a factor with respect to the other). Here, in the conventional example, the number M of the stator salient poles is 4, the number P of rotor magnetic poles is 4 and the number N of the fan blades is 6 and thus, the variation of the cogging torque, i.e., the minimum common multiple A of the number M of the stator salient poles and the number P of rotor magnetic poles is 4 th-degree, and a basic order of vibration of the cogging torque and the fan blades is 12 which is a minimum common multiple of 4 and 6. As one example which satisfies the $mN \neq nA$ of this embodiment, if the number M of the stator salient poles is set to 4 and the number P of rotor magnetic poles is set to 4 and the number P of rotor magnetic poles is set to 4, and the number N of the fan blades is set to 7 as shown in FIGS. 1A and 1B, the vibration order is 28th-degree, the order of vibration frequency is largely increased, and the vibration can be suppressed.

In this manner, by selecting the number M of the stator salient poles, the number P of rotor magnetic poles and the number N of the fan blades such that the order A of the cogging torque does not become a multiple of the number N of the fan blades and the number N of the fan blades does not become a multiple of the order A of the cogging torque, it is possible to prevent a vibration due to the cogging torque and an order of vibration due to the fan blades from coinciding with reach other, thereby increasing the order of the vibration of the fan. Since the order of vibration of the fan in this case is higher than that of the vibration due to the cogging torque and fan blades, the vibration energy becomes smaller. Therefore, with the above structure, it is possible to suppress both the vibration generated by the cogging torque which is peculiar to a permanent magnet motor and the vibration generated by the fan blades. Further, if the order A of the cogging torque and the number N of the fan blades are selected such as to satisfy $mN=nA\pm1$, it is possible to further increase the minimum common multiple of the order A of the cogging torque and the number N of the fan blades. For example, as shown in FIGS. 2A and 2B, if the number M of the stator salient poles is set to 6 and the number P of rotor magnetic poles is set to 6, i.e., the order of the cogging torque is set to 6 and the number N of the fan blades is set to 7, the vibration frequency is increased up to 42nd-degree, and it is possible to further suppress the vibration.

Fourth Embodiment

In this embodiment, the number M of the stator salient poles and the number Q of sides of the polygonal housing provided around the outer periphery of the fan are set such as to satisfy $mQ \neq nM$ (one of m and n is a natural number which is a factor with respect to the other). Here, in the conventional example, the number M of the stator salient poles is 4, the number Q of sides of the housing is 4. Therefore, the basic order of vibration by the rotor distortion and the housing is 4 which is a minimum common multiple of 4 and 4. As one example which satisfies the $mQ \neq nM$ of this embodiment, if the number M of the stator salient poles is set to 6 and the number Q of sides of the housing is set to 4, as shown in FIGS. 2A and 2B, the vibration order is 12th-degree, the order of vibration frequency is largely increased, and the vibration can be suppressed.

In this manner, by selecting the number M of the stator salient poles and the number Q of sides of the housing such that the number M of the stator salient poles does not become the number Q of sides of the housing and such the number Q of sides of the housing does not become the number M of the stator salient poles, it is possible to prevent a vibration due to the distortion and eccentricity of the rotor and the vibration due to the housing from coinciding with reach other, thereby increasing the order of the vibration of the blowing apparatus. Since the order of vibration of the blowing apparatus in this case is higher than that of the vibration due to the rotor distortion and the housing, the vibration energy becomes smaller. Therefore, with the above structure, it is possible to suppress both the vibration generated by the distortion and eccentricity of the rotor and the vibration generated by the housing. Further, if the number M of the stator salient poles and the number Q of sides of the housing are selected such as to satisfy $mQ=nM\pm1$, it is possible to further increase the minimum common multiple of the number M of the stator salient poles and the number Q of sides of the housing.

Fifth Embodiment

In this embodiment, the number P of rotor magnetic poles and the number Q of side of the housing are set such as to satisfy $mQ \neq nP$ (one of m and n is a natural number which is a factor with respect to the other). Here, in the conventional example, the number M of the stator salient poles is 4 and the number Q of side of the housing is 4 and thus, a basic order of vibration caused by distortion of the rotor and vibration of the fan blades is 4 which is minimum common multiple of 4 and 4. As one example which satisfies the $mQ \neq nP$ of this embodiment, if the number P of rotor magnetic poles is set to 6 and the number Q of side of the housing is set to 4 as shown in FIGS. 2A and 2B, the vibration order is 12th-degree, the order of vibration frequency is largely increased, and the vibration can be suppressed.

In this manner, by selecting the number P of rotor magnetic poles and the number Q of side of the housing such that the number P of rotor magnetic poles does not become a multiple of the number Q of side of the housing and the number Q of side of the housing does not become a multiple of the number P of rotor magnetic poles, it is possible to prevent an order vibration due to distortion of the stator and an order of vibration due to the housing from coinciding with reach other, thereby increasing the order of the vibration of the blowing apparatus. Since the order of vibration of the blowing apparatus in this case is higher than that of the vibration due to the rotor distortion and housing, the vibration energy becomes smaller. Therefore, with the above structure, it is possible to suppress both the vibration generated by the distortion of the stator and the vibration generated by the housing. Further, if the number P of rotor magnetic poles and the number Q of side of the housing are selected such as to satisfy mQ=nP±1, it is possible to further increase the minimum common multiple of the number P of rotor magnetic poles and the number Q of side of the housing.

Sixth Embodiment

In this embodiment, the minimum common multiple A of the number M of the stator salient poles and the number P of rotor magnetic poles and the number Q of side of the housing are set such as to satisfy mQ≠nA (one of m and n is a natural number which is a factor with respect to the other). Here, in the conventional example, the number M of the stator salient poles is 4, the number P of rotor magnetic poles is 4 and the number Q of side of the housing is 4 and thus, the variation of the cogging torque, i.e., the minimum common multiple A of the number M of the stator salient poles and the number P of rotor magnetic poles is 4 th-degree, and a basic order of vibration of the cogging torque and the fan blades is 4 which is a minimum common multiple of 4 and 4. As one example which satisfies the mQ≠nA of this embodiment, if the number M of the stator salient poles is set to 6 and the number P of rotor magnetic poles is set to 6 and the number Q of side of the housing is set to 4 as shown in FIGS. 2A and 2B, the vibration order is 12th-degree, the order of vibration frequency is largely increased, and the vibration can be suppressed.

In this manner, by selecting the number M of the stator salient poles, the number P of rotor magnetic poles and the number Q of side of the housing such that the order A of the cogging torque does not become a multiple of the number Q of side of the housing and the number Q of side of the housing does not become a multiple of the order A of the cogging torque, it is possible to prevent a vibration due to the cogging torque and an order of vibration due to the housing from coinciding with reach other, thereby increasing the order of the vibration of the blowing apparatus. Since the order of vibration of the blowing apparatus in this case is higher than that of the vibration due to the cogging torque and housing, the vibration energy becomes smaller. Therefore, with the above structure, it is possible to suppress both the vibration generated by the cogging torque which is peculiar to a permanent magnet motor and the vibration generated by the housing. Further, if the order A of the cogging torque and the number Q of side of the housing are selected such as to satisfy mQ=nA±1, it is possible to further increase the minimum common multiple of the order A of the cogging torque and the number Q of side of the housing.

Seventh Embodiment

In this embodiment, the number N of fan blades and the number Q of side of the housing are set such as to satisfy mQ≠nN (one of m and n is a natural number which is a factor with respect to the other). Here, in the conventional example, the number N of fan blades is 6 and the number Q of side of the housing is 4 and thus, a basic order of vibration caused by distortion of the fan blades and vibration of the housing is 12 which is minimum common multiple of 6 and 4. As one example which satisfies the mQ≠nN of this embodiment, if the number N of fan blades is set to 7 and the number Q of side of the housing is set to 4 as shown in FIGS. 2A and 2B, the vibration order is 28th-degree, the order of vibration frequency is largely increased, and the vibration can be suppressed.

In this manner, by selecting the number N of the fan blades and the number Q of sides of the housing such that the number N of fan blades does not become a multiple of the number Q of side of the housing and the number Q of side of the housing does not become a multiple of the number N of fan blades, it is possible to prevent an order vibration due to distortion of the fan and an order of vibration due to the housing from coinciding with each other, thereby increasing the order of the vibration of the blowing apparatus. Since the order of vibration of the blowing apparatus in this case is higher than that of the vibration due to the fan blades and housing, the vibration energy becomes smaller. Therefore, with the above structure, it is possible to suppress both the vibration generated by the fan blades and the vibration generated by the housing. Further, if the number N of fan blades and the number Q of side of the housing are selected such as to satisfy mQ=nN±1, it is possible to further increase the minimum common multiple of the number N of fan blades and the number Q of side of the housing.

Eighth Embodiment

In this embodiment, the number M of the stator salient poles and the number R of spokes for fixing the motor and the housing provided around the outer periphery of the fan satisfies a relation mR≠nM (one of m and n is a natural number which is a factor with respect to the other). Here, in the conventional example, the number M of the stator salient poles is 4 and the number R of spokes is 4 and thus, a basic order of vibration caused by distortion of the rotor and vibration of the spokes is 4 which is minimum common multiple of 4 and 4. As one example which satisfies the mR≠nM of this embodiment, if the number M of the stator salient poles is set to 6 and the number R of spokes is set to 3 as shown in FIGS. 2A and 2B, the vibration order is 6th-degree, the order of vibration frequency is largely increased, and the vibration can be suppressed.

In this manner, by selecting the number M of the stator salient poles and the number R of spokes such that the number M of the stator salient poles does not become a multiple of the number R of spokes and the number R of spokes does not become a multiple of the number M of the stator salient poles, it is possible to prevent an order vibration due to distortion or eccentricity of the. rotor and an order of vibration due to the spokes from coinciding with reach other, thereby increasing the order of the vibration of the blowing apparatus. Since the order of vibration of the blowing apparatus in this case is higher than that of the vibration due to the rotor distortion and spokes, the vibration energy becomes smaller. Therefore, with the above structure, it is possible to suppress both the vibration generated by the distortion or eccentricity of the rotor and the vibration generated by the spokes. Further, if the number M of the stator salient poles and the number R of spokes are selected such as to satisfy mR=nM±1, it is possible to further increase the minimum common multiple of the number M of the stator salient poles and the number R of spokes. For example, as shown in FIGS. 1A and 1B, if the number M of stator salient poles is set to 4 and the number R of spokes is set to 3, the vibration frequency is increased up to 12th-degree, and it is possible to further suppress the vibration.

Ninth Embodiment

In this embodiment, the number P of rotor magnetic poles and the number R of spokes satisfies a relation mR≠nP (one of m and n is a natural number which is a factor with respect to the other). Here, in the conventional example, the number P of rotor magnetic poles is 4 and the number R of spokes is 4 and thus, a basic order of vibration caused by distortion of the rotor and vibration of the spokes is 4 which is minimum common multiple of 4 and 4. As one example which satisfies the mR≠nP of this embodiment, if the number P of rotor magnetic poles is set to 6 and the number R of spokes is set to 3 as shown in FIGS. 2A and 2B, the vibration order is 6th-degree, the order of vibration frequency is largely increased, and the vibration can be suppressed.

In this manner, by selecting the number P of rotor magnetic poles and the number R of spokes such that the number P of rotor magnetic poles does not become a multiple of the number R of spokes and the number R of spokes does not become a multiple of the number P of rotor magnetic poles, it is possible to prevent an order vibration due to distortion or eccentricity of the rotor and an order of vibration due to the spokes from coinciding with reach other, thereby increasing the order of the vibration of the blowing apparatus. Since the order of vibration of the blowing apparatus in this case is higher than that of the vibration due to the rotor distortion and spokes, the vibration energy becomes smaller. Therefore, with the above structure, it is possible to suppress both the vibration generated by the distortion or eccentricity of the rotor and the vibration generated by the spokes. Further, if the number P of rotor magnetic poles and the number R of spokes are selected such as to satisfy mR=nP±1, it is possible to further increase the minimum common multiple of the number P of rotor magnetic poles and the number R of spokes. For example, as shown in FIGS. 1A and 1B, if the number M of stator salient poles is set to 4 and the number R of spokes is set to 3, the vibration frequency is increased up to 12th-degree, and it is possible to further suppress the vibration.

Tenth Embodiment

In this embodiment, the minimum common multiple A of the number M of the stator salient poles and the number P of rotor magnetic poles and the number R of spokes are set such as to satisfy mR≠nA (one of m and n is a natural number which is a factor with respect to the other). Here, in the conventional example, the number M of the stator salient poles is 4, the number P of rotor magnetic poles is 4 and the number R of spokes is 4 and thus, the variation of the cogging torque, i.e., the minimum common multiple A of the number M of the stator salient poles and the number P of rotor magnetic poles is 4 th-degree, and a basic order of vibration of the cogging torque and the spokes is 12 which is a minimum common multiple of 4 and 4. As one example which satisfies the mR≠nA of this embodiment, if the number M of the stator salient poles is set to 4 and the number P of rotor magnetic poles is set to 4 and the number P of rotor magnetic poles is set to 4, and the number R of spokes is set to 3 as shown in FIGS. 1A and 1B, the vibration order is 12th-degree, the order of vibration frequency is largely increased, and the vibration can be suppressed.

In this manner, by selecting the number M of the stator salient poles, the number P of rotor magnetic poles and the number R of spokes such that the order A of the cogging torque does not become a multiple of the number R of spokes and the number R of spokes does not become a multiple of the order A of the cogging torque, it is possible to prevent a vibration due to the cogging torque and an order of vibration due to the spokes from coinciding with reach other, thereby increasing the order of the vibration of the blowing apparatus. Since the order of vibration of the blowing apparatus in this case is higher than that of the vibration due to the cogging torque and spokes, the vibration energy becomes smaller. Therefore, with the above structure, it is possible to suppress both the vibration generated by the cogging torque which is peculiar to a permanent magnet motor and the vibration generated by the spokes. Further, if the order A of the cogging torque and the number R of spokes are selected such as to satisfy mR=nA±1, it is possible to further increase the minimum common multiple of the order A of the cogging torque and the number R of spokes.

In this manner, by selecting the number N of the fan blades and the number Q of sides of the housing such that the number N of fan blades does not become a multiple of the number Q of side of the housing and the number Q of side of the housing does not become a multiple of the number N of fan blades, it is possible to prevent an order vibration due to distortion of the fan and an order of vibration due to the housing from coinciding with each other, thereby increasing the order of the vibration of the blowing apparatus. Since the order of vibration of the blowing apparatus in this case is higher than that of the vibration due to the fan blades and housing, the vibration energy becomes smaller. Therefore, with the above structure, it is possible to suppress both the vibration generated by the fan blades and the vibration generated by the housing. Further, if the number N of fan blades and the number Q of side of the housing are selected such as to satisfy mQ=nN±1, it is possible to further increase the minimum common multiple of the number N of fan blades and the number Q of side of the housing.

Eleventh Embodiment

In this embodiment, the number N of fan blades and the number R of spokes are set such as to satisfy mR≠nN (one of m and n is a natural number which is a factor with respect to the other). Here, in the conventional example, the number N of fan blades is 6 and the number R of spokes is 4 and thus, a basic order of vibration caused by distortion of the fan blades and vibration of the spokes is 12 which is minimum common multiple of 6 and 4. As one example which satisfies the mR≠nN of this embodiment, if the number N of fan blades is set to 7 and the number R of spokes is set to 3 as shown in FIGS. 1A and 1B, the vibration order is 21st-degree, the order of vibration frequency is largely increased, and the vibration can be suppressed.

In this manner, by selecting the number N of the fan blades and the number R of sides of the spokes such that the number N of fan blades does not become a multiple of the number R of spokes and the number R of spokes does not become a multiple of the number N of fan blades, it is possible to prevent an order vibration due to distortion of the fin and an order of vibration due to the spokes from coinciding with reach other, thereby increasing the order of the vibration of the blowing apparatus. Since the order of vibration of the blowing apparatus in this case is higher than that of the vibration due to the fan blades and spokes, the vibration energy becomes smaller. Therefore, with the above structure, it is possible to suppress both the vibration generated by the fan blades and the vibration generated by the spokes. Further, if the number N of fan blades and the number R of spokes are selected such as to satisfy mR=nN±1, it is possible to further increase the minimum common multiple of the number N of fan blades and the number R of spokes.

Although the above embodiments only show a case in which the number P of rotor magnetic poles is 4, the number M of the stator salient poles is 4, the housing is rectangular in shape and the number of spokes is 3, and a case in which the number P of rotor magnetic poles is 6, the number M of the stator salient poles is 6, the housing is rectangular and the number of spokes is 3, this invention is not limited to these cases.

Twelfth embodiment

In this embodiment, the number R of spokes and the number Q of side of the housing are set such as to satisfy mQ≠nR (one of m and n is a natural number which is a factor with respect to the other). Here, in the conventional example, the number R of spokes is 4 and the number Q of side of the housing is 4 and thus, a basic order of vibration caused by the spokes and housing is 4 which is minimum common multiple of 4 and 4. As one example which satisfies the mQ≠nR of this embodiment, if the number R of spokes is set to 3 and the number Q of side of the housing is set to 4 as shown in FIGS. 1A and 1B, the vibration order is 12th-degree, the order of vibration frequency is largely increased, and the vibration can be suppressed.

In this manner, by selecting the number R of spokes and the number Q of side of the housing such that the number R of spokes does not become a multiple of the number Q of side of the housing and the number Q of side of the housing does not become a multiple of the number R of spokes, it is possible to prevent an order vibration due to distortion of the stator and an order of vibration due to the housing from coinciding with reach other, thereby increasing the order of the vibration of the blowing apparatus. Since the order of vibration of the blowing apparatus in this case is higher than that of the vibration due to the spokes and housing, the vibration energy becomes smaller. Therefore, with the above structure, it is possible to suppress both the vibration generated by the distortion of the stator and the vibration generated by the housing. Further, if the number R of spokes and the number Q of side of the housing are selected such as to satisfy mQ=nR±1, it is possible to further increase the minimum common multiple of the number R of spokes and the number Q of side of the housing.

What is claimed is:

1. A blowing apparatus comprising a stator having a core including a M-number of salient poles, a rotor having permanent magnets having a P-number of magnetic poles rotatably located opposite to magnetic pole surfaces of said stator, the stator and the rotor, in combination, forming a motor for rotating a fan having a Q-number of blades, and a polygonal housing having a Q-number of sides located around an outer periphery of the fan, wherein mQ satisfies one of mQ≠nM (one of m and n is a whole number which is a factor with respect to the other, wherein Q is a non-infinite number) and mQ=nM±1.

2. A blowing apparatus comprising a stator having a core including a M-number of salient poles, a rotor having permanent magnets having a P-number of magnetic poles rotatably located opposite to magnetic pole surfaces of said stator, the stator and the rotor, in combination, forming a motor for rotating a fan having a N-number of blades, and a polygonal housing having a Q-number of sides located around an outer periphery of the fan, wherein mQ satisfies one of mQ≠nP (one of m and n is a whole number which is a factor with respect to the other, wherein Q is a non-infinite number) and mQ=nP±1.

3. A blowing apparatus comprising a stator having a core including a M-number of salient poles, a rotor having permanent magnets having a P-number of magnetic poles rotatably located opposite to magnetic pole surfaces of said stator, the stator and the rotor, in combination, forming a motor for rotating a fan having a N-number of blades, and a polygonal housing having a Q-number of sides located around an outer periphery of the fan, wherein if a minimum common multiple of the number M of the stator salient poles and the number P of rotor magnetic poles is defined as A, mQ satisfies one of mQ≠nA (one of m and n is a whole number which is a factor with respect to the other, wherein Q is a non-infinite number) and mQ=nP±1.

4. A blowing apparatus comprising a stator having a core including a M-number of salient poles, a rotor having permanent magnets having a P-number of magnetic poles rotatably located opposite to magnetic pole surfaces of said stator, the stator and the rotor, in combination, forming a motor for rotating a fan having a N-number of blades, and a polygonal housing having a Q-number of sides located around an outer periphery of the fan, wherein mQ satisfies one of mQ≠nN (one of m and n is a whole number which is a factor with respect to the other, wherein Q is a non-infinite number) and mQ=nN±1.

5. A blowing apparatus comprising a stator having a core including a M-number of salient poles, a rotor having permanent magnets having a P-number of magnetic poles rotatably located opposite to magnetic pole surfaces of said stator, the stator and the rotor, in combination, forming a motor for rotating a fan having a N-number of blades, a polygonal housing having a Q-number of sides located around an outer periphery of the fan, and a R-number of spokes for fixing the housing and the motor, wherein mR satisfies one of mR≠nQ (one of m and n is a whole number which is a factor with respect to the other, wherein Q is a non-infinite number) and mR=nQ±1.

6. The blowing apparatus according to claim 1, wherein said blowing apparatus is installed in an electronic apparatus.

* * * * *